United States Patent
Marshall (10) Patent No.: US 11,340,998 B1
(45) Date of Patent: May 24, 2022

(54) SYSTEMS AND METHODS FOR PROVIDING BACKUP STORAGE AND VERIFYING THE INTEGRITY OF BACKUP FILES

(71) Applicant: Verified Backups LLC, St. Louis, MO (US)

(72) Inventor: Stuart Christopher Marshall, St. Louis, MO (US)

(73) Assignee: VERIFIED BACKUPS LLC, St. Louis, MO (US)

( * ) Notice: Subject to any disclaimer, the term of this patent is extended or adjusted under 35 U.S.C. 154(b) by 0 days.

(21) Appl. No.: 17/538,867

(22) Filed: Nov. 30, 2021

Related U.S. Application Data (60) Provisional application No. 63/132,515, filed on Dec. 31, 2020.

(51) Int. Cl.
    G06F 11/00   (2006.01)
    G06F 11/14   (2006.01)
    G06F 11/07   (2006.01)

(52) U.S. Cl.
    CPC ...... G06F 11/1464 (2013.01); G06F 11/0772 (2013.01); G06F 11/1451 (2013.01); G06F 11/1469 (2013.01)

(58) Field of Classification Search
    CPC ............. G06F 11/1451; G06F 11/1469; G06F 11/1464; G06F 11/0772
    See application file for complete search history.

(56) References Cited

U.S. PATENT DOCUMENTS

| | | | |
|---|---|---|---|
| 6,105,027 A | 8/2000 | Schneider et al. | |
| 7,574,459 B2 * | 8/2009 | Sen | G06F 11/1469 |
| 7,685,180 B2 * | 3/2010 | Lohn | G06F 11/1469 |
| | | | 707/999.204 |
| 7,702,867 B2 * | 4/2010 | Coombs | G06F 11/1448 |
| | | | 711/162 |
| 8,260,750 B1 | 9/2012 | Gugick et al. | |
| 9,002,798 B1 * | 4/2015 | Raj | G06F 16/128 |
| | | | 707/654 |
| 9,588,849 B2 | 3/2017 | Sinha | |
| 10,198,312 B2 * | 2/2019 | Xiang | G06F 3/0683 |
| 10,552,265 B1 * | 2/2020 | Lv | G06F 11/1438 |
| 10,936,426 B2 * | 3/2021 | Lv | G06F 11/1451 |
| 2013/0326279 A1 * | 12/2013 | Chavda | G06F 11/3672 |
| | | | 714/E11.178 |

(Continued)

OTHER PUBLICATIONS

Korotkevitch, "Designing a Backup Strategy" Pro SQL Server Internals, Chapter 30, 2016 pp. 603-624.

(Continued)

*Primary Examiner* — Elmira Mehrmanesh (74) *Attorney, Agent, or Firm* — Bryan Cave Leighton Paisner LLP

(57) ABSTRACT

The present disclosure relates to improved systems, methods, apparatuses, and techniques providing data backup, restoration, and verification functions. In certain embodiments, a backup storage platform provides backup services for files stored on the client servers. The backup storage platform can execute verification functions that verify the integrities of the backup copies by determining whether the backup copies have become corrupted, determining whether the backup copies are restorable, and determining whether the backup copies include the most current or contemporaneous information.

20 Claims, 4 Drawing Sheets

(56) References Cited

U.S. PATENT DOCUMENTS

| | | | |
|---|---|---|---|
| 2014/0047232 A1 | 2/2014 | Hannel et al. | |
| 2016/0306709 A1 | 10/2016 | Shaull | |
| 2017/0228417 A1* | 8/2017 | Maccanti | G06F 16/278 |
| 2019/0278748 A1 | 9/2019 | Amarendran et al. | |
| 2019/0340277 A1* | 11/2019 | Thomsen | G06F 11/1469 |
| 2020/0004850 A1* | 1/2020 | Reed | G06F 16/2329 |
| 2020/0042395 A1 | 2/2020 | Chu et al. | |
| 2020/0117550 A1* | 4/2020 | Zhang | G06F 11/1464 |

OTHER PUBLICATIONS

Ward "High Availability and Disaster Recovery for SQL Server" Pro SQL Server on Linux, Chapter 8, pp. 369-436.
Malcher, et al. "Pro Oracle Database 18c Administration," Third Edition pp. 1-1009.

\* cited by examiner

| Database | Table | Field | Backup Date | Most Recent Activity | Verified |
|---|---|---|---|---|---|
| Simplified | tbl_Dispatch | PickupDate | 09/27/2021 | 09/30/2021 | ✓ |
| Simplified | tbl_Dispatch | PickupDate | 09/26/2021 | 09/30/2021 | ✓ |
| Simplified | tbl_Dispatch | PickupDate | 09/25/2021 | 09/30/2021 | ✓ |
| Simplified | tbl_Dispatch | PickupDate | 09/24/2021 | 09/30/2021 | ✓ |
| Simplified | tbl_Dispatch | PickupDate | 09/23/2021 | 09/30/2021 | ✓ |
| Simplified | tbl_Dispatch | PickupDate | 09/22/2021 | 09/27/2021 | ✓ |
| Simplified | tbl_Dispatch | PickupDate | 09/21/2021 | 09/27/2021 | ✓ |
| Simplified | tbl_Dispatch | PickupDate | 09/20/2021 | 09/27/2021 | ✓ |

FIG. 3

SYSTEMS AND METHODS FOR PROVIDING BACKUP STORAGE AND VERIFYING THE INTEGRITY OF BACKUP FILES

CROSS-REFERENCE TO RELATED APPLICATIONS

This present application claims the benefit of, and priority to, U.S. Provisional Application No. 63/132,515 filed on Dec. 31, 2020. The content of the aforementioned application is incorporated by reference herein in its entirety.

TECHNICAL FIELD

This disclosure is related to technologies for implementing data backup and restoration functions, and verifying the integrity of backup files.

BACKGROUND

Many businesses and individuals experience data loss. The impact of data loss can be severe and, in some scenarios, may involve the loss of data pertaining to transactions, customer information, financial information, personal information, multimedia files (e.g., pictures and music), and many other forms of digital content. Data loss can be caused by a variety of different factors including, but not limited to, computer viruses, hardware failures, file corruption, natural disasters, malware, ransomware, and human error.

Various backup services and applications have been developed to mitigate the effects of data loss. In many cases, these backup services and applications can store backup copies of files on a device that is intended to serve as fail-safe in the event of data loss. The expectation is that the backup files can be used to remedy, or at least mitigate, the impact of data loss event.

Traditional backup services and applications fail to account for various factors that can impact the usefulness of the backup copies and/or exacerbate the negative impacts of a data loss event. For example, at various points during a backup process, the files that are being backed up may become corrupted. However, traditional backup services and applications do not verify that the backup files are useable, restorable, and uncorrupted. Furthermore, in many cases, backup files may be useless, or of limited value, if they do not include the most up-to-date information. Again, traditional backup services and applications do not verify the contents of backup files to determine whether they include the most current information.

In view of the foregoing, improved backup storage systems and methods are desired that address the aforementioned shortcomings (and other shortcomings) of traditional backup services and applications.

BRIEF DESCRIPTION OF DRAWINGS

To facilitate further description of the embodiments, the following drawings are provided, in which like references are intended to refer to like or corresponding parts, and in which.

DETAILED DESCRIPTION OF EXEMPLARY EMBODIMENTS

The present disclosure relates to improved systems, methods, apparatuses, and techniques providing data backup, restoration, and verification functions. In certain embodiments, a backup storage platform communicates over a network with client applications installed on client servers, and provides backup services for files (e.g., database files and/or other files) stored on the client servers. The files stored on the client servers may be periodically backed up and/or archived on the backup storage platform. In addition to storing the backup files, the backup storage platform can execute verification functions that are configured to verify the integrity of the backup files and/or to determine whether or not the backup files have become corrupted. The verification functions also can be configured to analyze the contents of the backup files to determine whether or not the backup files include the most current or contemporaneous information. In certain embodiments, the verification functions can be executed automatically on a periodic basis (e.g., daily) to confirm the backup copies maintained by the backup storage platform are recoverable, uncorrupted, and include up-to-date data.

In the event of a data loss event (or other event in which a restore operation is desired), the backup storage platform is able to provide a backup file that includes the most current information and which has been tested for restorability. Moreover, in scenarios when the verification component determines that a backup file is corrupted and/or does not include the most current information, the backup storage platform can automatically execute one or more remedial actions to ensure a proper backup is stored on the backup storage platform before the occurrence of a data loss event. One exemplary remedial action may include transmitting notifications that notify users of any detected issues. Another exemplary remedial action may include communicating with a client application and/or client server to automatically retrieve an updated backup file.

In certain embodiments, client applications can be installed locally on the servers or devices that store original copies of files intended to be backed up by the backup storage platform. Amongst other things, the client applications can permit client users to specify various settings associated with backing up and/or restoring files. The client applications also can enable client users to retrieve backup copies of files quickly and securely. The integrity and contemporaneousness of the backup copies retrieved by the client applications can be verified using the techniques described herein.

While certain portions of this disclosure may describe applications or examples of backup and restoration technologies in the context of databases, it should be recognized that these technologies also can be applied to any type of file or digital content. For example, in certain embodiments, the backup storage platform can alternatively, or additionally, be configured to communicate with client servers to provide backup services for multimedia files (e.g., audio/music files, images, videos, etc.), word processing files, source code files, spreadsheets, portable document format (PDF) files, and many other types of files.

As evidenced by the disclosure herein, the inventive techniques set forth in this disclosure are rooted in computer technologies that overcome existing problems in known file backup and restoration systems, specifically problems dealing with verifying the integrity of database files and/or other types of files. The technologies described in this disclosure provide a technical solution for overcoming the aforementioned limitations (as well as other limitations) associated with known techniques for providing these systems. For example, as explained in further detail below, the file backup technologies described in this disclosure can utilize improved verification techniques to evaluate the restorability and/or contemporaneousness of database files and/or other digital files. Amongst other things, a backup storage platform can be configured to automatically verify the integrity of backup copies, and execute various remedial functions in response to detecting backup failures. Moreover, these technologies permit the backup storage platform to perform these functions across different types of databases, despite the inconsistent formats and configurations of the databases. This technology-based solution marks an improvement over existing capabilities and functionalities related to backing up and restoring digital files, and can be useful for minimizing data loss in various scenarios.

The embodiments described in this disclosure can be combined in various ways. Any aspect or feature that is described for one embodiment can be incorporated to any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features, or components as being implemented in software or hardware, it should be recognized that any embodiment, feature and/or component referenced in this disclosure can be implemented in hardware and/or software.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium, such as a semiconductor or solid-state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Figure 1A:
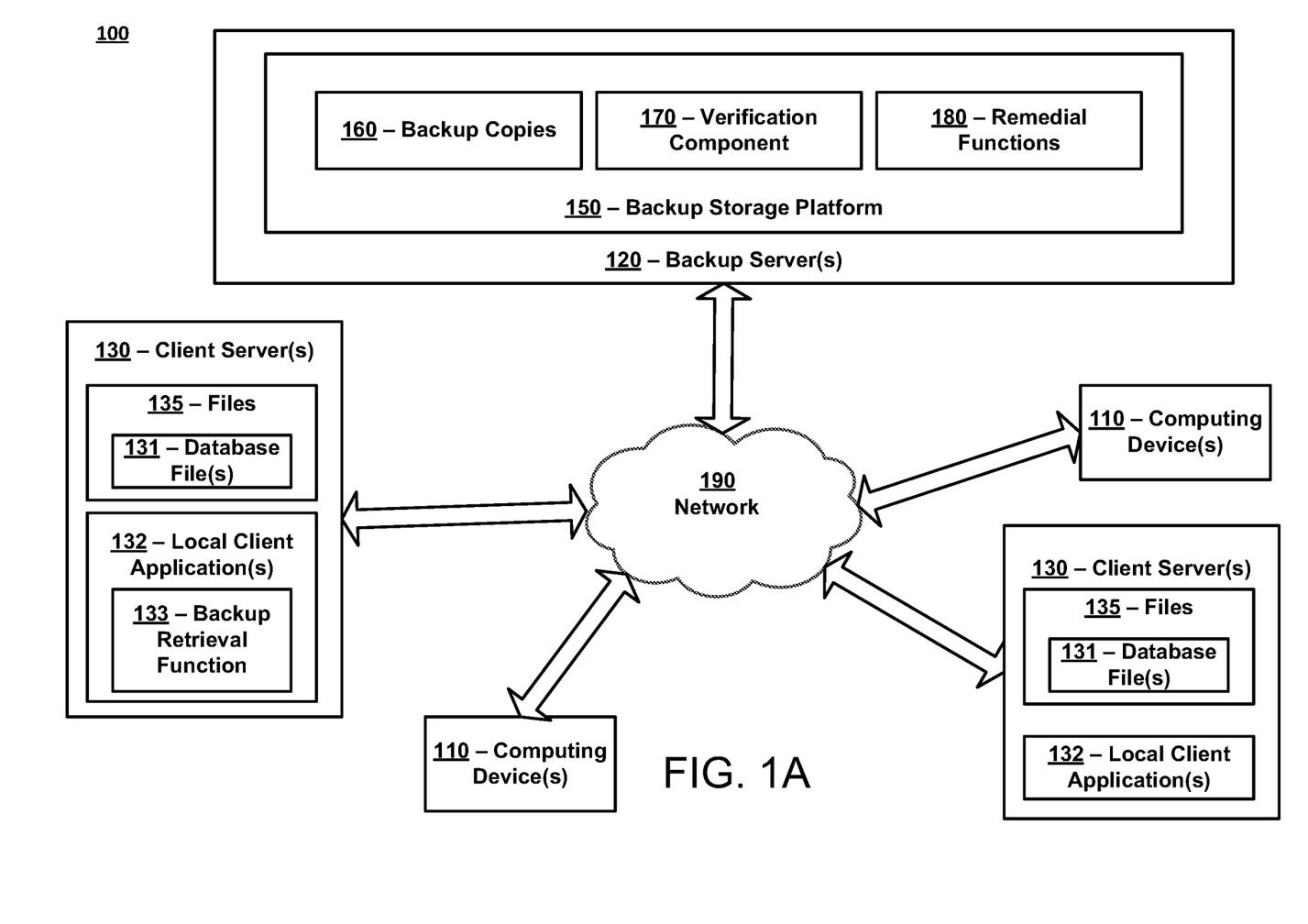
FIG. 1A is a block diagram of an exemplary system for providing data backup, restoration, and verification functions in accordance with certain embodiments.
Figure 1B:
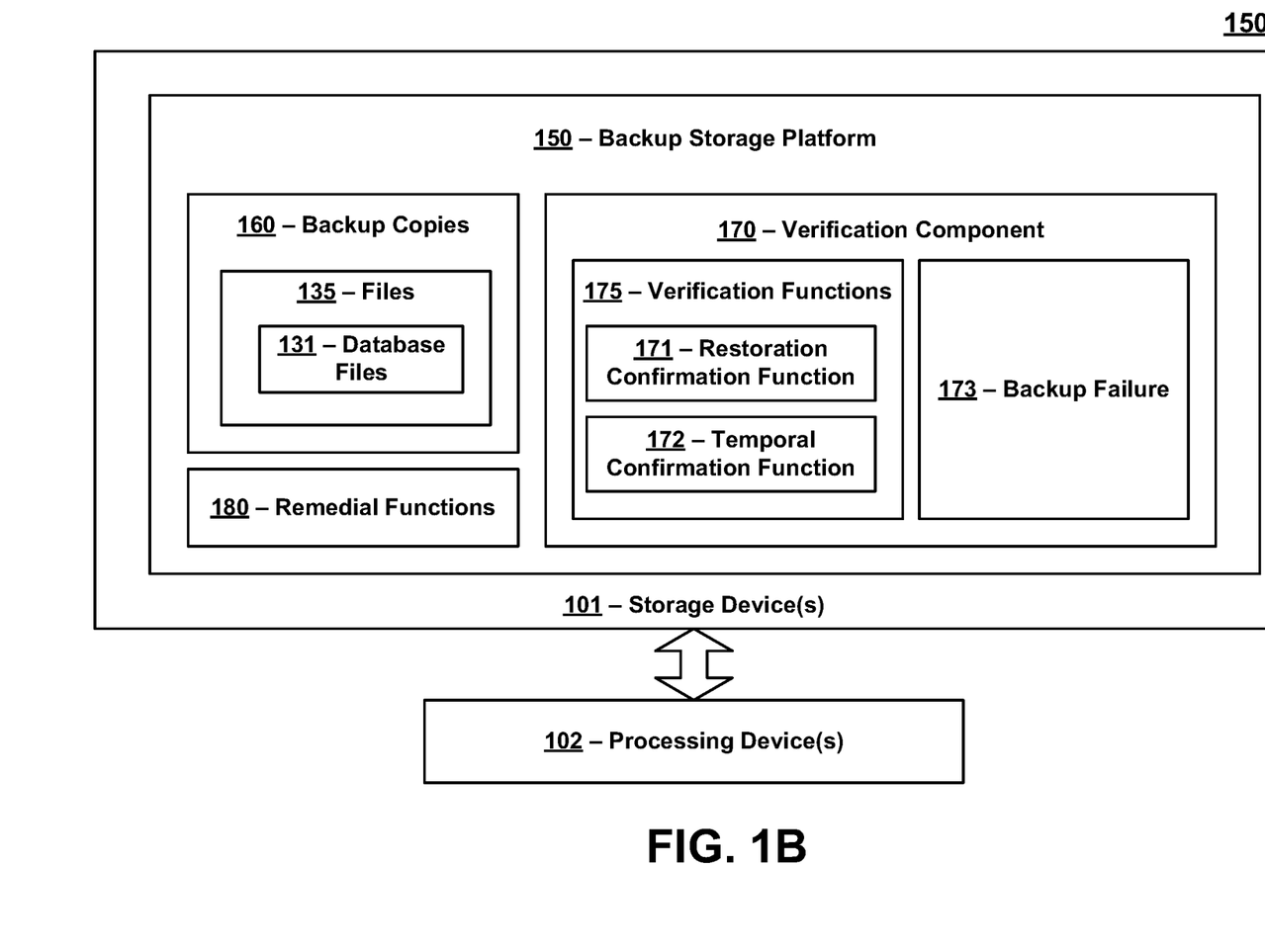
FIG. 1B is a block diagram of an exemplary backup storage platform in accordance with certain embodiments.

FIG. 1A is a block diagram of an exemplary system 100 in accordance with certain embodiments. FIG. 1B is a block diagram of an exemplary backup storage platform 150 in accordance with certain embodiments.

In certain embodiments, the system 100 comprises one or more computing devices 110, one or more backup servers 120, and one or more client servers 130 that are in communication over a network 190. A backup storage platform 150 is stored on, and executed by, the one or more backup servers 120. Local client applications 132 are stored on, and executed by, the one or more client servers 120. Each of the one or more client servers 120 also store one or more database files 131 and/or one or more files 135. The network 190 may represent any type of communication network, e.g., such as one that comprises the Internet, a local area network (e.g., a Wi-Fi network), a personal area network (e.g., a Bluetooth network), a wide area network, an intranet, a cellular network, a television network, and/or other types of networks. The system 100 may include any number of computing devices 110, backup servers 120, client servers 130, files 130, database files 131, local client applications 132, and/or backup storage platforms 150.

All the components illustrated in FIG. 1, including the computing devices 110, backup servers 120, client servers 130, and backup storage platform 150 can be configured to communicate directly with each other and/or over the network 190 via wired or wireless communication links, or a combination of the two. Each of the computing devices 110, backup servers 120, client servers 130, and backup storage platform 150 also can be equipped with one or more transceiver devices, one or more computer storage devices 101, and one or more processing devices 102 that are capable of executing computer program instructions.

The one or more processing devices 102 may include one or more central processing units (CPUs), one or more microprocessors, one or more microcontrollers, one or more controllers, one or more complex instruction set computing (CISC) microprocessors, one or more reduced instruction set computing (RISC) microprocessors, one or more very long instruction word (VLIW) microprocessors, one or more graphics processor units (GPU), one or more digital signal processors, one or more application specific integrated circuits (ASICs), and/or any other type of processor or processing circuit capable of performing desired functions. The one or more computer storage devices 101 can include (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In certain embodiments, the computer storage devices 101 can be physical, non-transitory mediums.

FIG. 1B illustrates an exemplary backup storage platform 150 being stored on one or more computer storage devices 101 and being executed by one or more processing devices 102. The local client applications 132 can similarly be stored on one or more computer storage devices 101 and can be executed by one or more processing devices 102.

In certain embodiments, the computing devices 110 may represent desktop computers, laptop computers, mobile devices (e.g., smart phones, personal digital assistants, tablet devices, vehicular computing devices, wearable devices, and/or any other device that is mobile in nature), and/or other types of devices. The computing devices 110 may be utilized by users to access accounts associated with the backup storage platform 150 (e.g., to view status of backup operations, configure settings for backup operations, and/or to initiate backup operations). Client users (e.g., associated with the client servers 130) may utilize the computing devices 110 to access a client side portal to perform various functions associated with their accounts. Administrator users (e.g., associated with a provider for the backup storage platform 150) may utilize the computing devices 110 to access an administrator portal to perform various administrative functions (e.g., to oversee and/or perform maintenance on client accounts).

The one or more backup servers 120 may generally represent any type of computing device, including any of the computing devices 110 mentioned above. In certain embodiments, the one or more backup servers 120 comprise one or more mainframe computing devices that execute web servers for communicating with the computing devices 110, client servers 130, and/or other applications and devices over the network 190 (e.g., over the Internet). In certain embodiments, the one or more backup servers 120 can represent one or more cloud servers and/or be implemented in a cloud-based computing environment.

Each client server 130 can include the same or similar configuration as the backup servers 120 described herein (e.g., which may include one or more mainframe servers, desktop computer devices, cloud servers, etc.). In certain embodiments, the one or more client servers 130 include or execute web servers for communicating with the computing devices 110, backup servers 120, and/or other applications and devices over the network 190 (e.g., over the Internet).

In certain embodiments, the backup storage platform 150 is stored on, and executed by, the one or more backup servers 120. In some cases, the backup storage platform 150 can represent a web-based application, SaaS application and/or cloud-based application that runs on the one or more back-up servers 120. The backup storage platform 150 can be configured to perform any and all functions described herein in connection with providing backup storage and restoration functions, and verifying the integrity of the backup copies 160.

In certain embodiments, the backup storage platform 150 can be stored on, and executed by, the one or more client servers 130. This can be useful in scenarios where an organization or company stores sensitive information (e.g., financial information, legal information, etc.) and/or information that is subject to strict regulatory measures. In these scenarios, the company or organization may wish backup their files locally on the client servers 130, rather than on external backup servers.

Client users (e.g., businesses, organizations, and/or individuals) associated with client servers 130 can utilize the functionality and services provided by the backup storage platform 150 to backup, archive, and/or verify files as described in further detail below. Client users may setup accounts on the backup storage platform 150 and/or enter into relationships with a provider of the backup storage platform 150 to gain access to the functionality and services provided by the backup storage platform 150.

In certain embodiments, users who desire to utilize the functionality and services provided by the backup storage platform 150 may install local client applications 132 on client servers 130. The client applications 132 can be configured to run locally on the client servers 130. The client applications 132 can be configured to communicate with the backup storage platform 150 and can permit client users to specify various settings associated with backing up and/or restoring files 135.

In certain embodiments, the client applications 132 can be configured to transmit files 135 to the backup storage platform 150 over the network 190, and the backup storage platform 150 can be configured to store backup copies 160 of the files 135. In some cases, the client applications 132 can be configured to compress and encrypt the files 135 before transmitting the files 135 over the network 190 to the backup storage platform 150. The files 135 may be transmitted over a secure and/or encrypted communication link to ensure safety and security of the files 135.

In some cases, the client applications 132 can automatically and periodically transmit the files 135 to the backup storage platform 150 for storage and archival. Additionally, or alternatively, the client applications 132 can transmit the files in response to client users manually selecting an option to back up the files 135 (e.g., in response to client users selecting an option included on an interface provided via the client applications 132).

Any type of file 135 may be transmitted to the backup storage platform 150 for storage and archival. In some scenarios, a company or organization may utilize the backup storage platform 135 to provide backup services for business files and documents. In other scenarios, individuals may utilize the backup storage platform 135 to provide backup services for personal information, documents, and other files. Exemplary files 135 that may be transmitted to the backup storage platform 150 for backup storage may include multimedia files (e.g., audio/music files, image files, video files, etc.), word processing files, source code files, spreadsheets, portable document format (PDF) files, and many other types of files.

In certain embodiments, some or all of the files 135 transmitted to the backup storage platform 150 for storage and archival may include database files 131. For example, the client servers 130 may execute one or more database applications in connection with performing various functions. The database applications create, update, and store database files 131 in connection with providing these functions. The content of the database files 131 can vary greatly and, in some examples, may include data related pertaining to one or more of the following: financials, transactions, medical records, inventory, logistics, shipping information, product and/or service offerings, accounting information, employee information, credit card information, etc. The formats of the database files 131 and types of database applications utilized by the client servers 130 also can vary greatly. Exemplary database applications and database file formats can include those offered by Microsoft® SQL Server, Oracle ®, IBM® DB2, and many other providers.

In some cases, some or all of the database files 131 can be associated with SQL (structured query language) databases and/or other types of relational databases. Some or all of the database files 131 can additionally, or alternatively, be associated with NoSQL databases, distributed databases, centralized databases, hierarchical databases, graph-based databases, multi-dimensional databases, blockchain-based databases, object-oriented databases, cloud-based databases, and/or other types of databases. The backup storage platform 150 can be configured to provide backup, archival, and/or verification functions for any database files 131 associated with of the aforementioned databases and/or other types of databases.

Any and all files 135 (including database files 131) received by the backup servers 120 can be stored by the backup storage platform 150 as backup copies 160. Users can access the backup copies 160 as desired. For example, in response to a data loss event on a client server 130, a client user may utilize a computing device 110 to access a backup copy 160 of one or more files that have been deleted, damaged, and/or corrupted. In certain embodiments, the local client applications 132 can execute a backup retrieval function 133 to securely retrieve a backup copy 160 from the backup storage platform 150 when desired. In some cases, the backup copies 160 stored on the backup storage platform 150 can be transmitted to the client servers 130 in connection with performing disaster recovery and/or other recovery functions.

The backup retrieval function 133 can enable client users to quickly access and retrieve backup copies 160 for various reasons. For example, a user may utilize the backup retrieval function 133 to restore a local database or file on a client server 130. Client users also may be desire to retrieve backup copies 160 for other reasons (e.g., to provide copies to customers and/or sales personnel).

The backup retrieval function 133 can permit users to select the backup copies that are desired to be retrieved (e.g., to request a most recent backup copy of a file and/or an older backup copy of a file). In response to receiving a request to retrieve a backup copy 160, the backup storage platform 150 can encrypt and/or compress the requested backup copy 160 and transmit the backup copy 160 over the network 190 to a client server 130 and/or computing device 110. In some cases, a file transfer protocol (FTP) may be utilized to transfer the requested backup file 160 to one or more client users.

In some cases, the backup retrieval function 133 can be included as part of the local client applications 132 that are stored on the client servers 130 and/or computing devices 110. Additionally, or alternatively, the backup retrieval function 133 can represent a standalone script or application that is executed by the client servers 130 and/or computing devise 110.

A verification component 170 can execute various verification functions 175 to analyze the backup copies 160 and/or to confirm the integrity of the backup copies 160. For example, in scenarios where the backup copies 160 are compressed and encrypted, the verification component 170 may initially execute verification functions 175 to decompress and unencrypt the backup copies 160.

For each backup copy 160, the verification component 170 also may execute a restoration confirmation function 171 that attempts to restore the backup copy 160 or a portion of the backup copy 160. The restoration confirmation function permits the verification component 170 to determine whether or not the backup copy 160 has been corrupted and/or is able to be restored. For example, in the event that the restoration confirmation function 171 is unable to restore the backup copy 160 or portion thereof, the verification component 170 may determine that the backup copy 160 has been corrupted and/or is unable to be restored. On the other hand, if the restoration confirmation function 171 is able to restore the backup copy 160 or portion thereof, the verification component 170 may determine that the backup copy 160 is not corrupted and/or is a restorable backup copy 170.

For example, in the context of a backup copy 160 corresponding to backup database file 131, the restoration confirmation function 171 may initially decrypt and decompress the database files 131. The restoration confirmation function may then attempt to restore the backup database file 131, or portion of the backup database file 131, to determine whether or not the backup database file 131 was corrupted.

In some embodiments, the verification component 170 also may execute a temporal confirmation function 172 that checks or determines whether the contents of the backup copies 160 are current and/or contemporaneous (e.g., include up-to-date information). For each backup copy 160, the temporal confirmation function 172 may retrieve and/or analyze the contents of the backup copy 160 to determine whether or not the backup copy 160 includes current information. For example, in the context of backup copies 160 corresponding to backup database files 131, the temporal confirmation function 172 may retrieve and/or analyze a data field, table field, and/or other data point included in the restored database file to determine whether or not the backup copy 160 includes current information.

As mentioned above, the types and formats of databases can vary greatly. To address the variability across different database structures, the temporal confirmation function 172 may execute a database-agnostic script that is configured to search the contents of the restored database files for data points that are related to temporal information (e.g., related to dates or timestamps). For example, upon identifying a column, row, field, and/or other data point that includes temporal information in a restored database file, the temporal confirmation function 172 may analyze the temporal information associated with the data point to determine whether the restored database file is current and/or up-to-date.

Similar techniques can be utilized for other types of files 135 (non-database files) to confirm they are current or include up-to-date information. For example, for other types of files 135, the temporal confirmation function 172 may analyze metadata and/or other data points associated with the files 135 to assess with they are current or include up-to-date information.

Various errors can occur during the process of backing up files 130, which can lead to backup failures 173. For example, errors may occur during one or more of the following operations: a local client application 132 compresses a file 135; a local client application 132 encrypts a file 135; a file 135 is transmitted over a network 190; and/or a backup copy 160 is created by the backup storage platform 150. An error occurring at any point in the backup process can compromise the integrity of the files 135 and, in many cases, may result in a backup copy 160 being un-restorable and/or failing to be updated with the most recent information or data. Thus, the restoration confirmation function 171 and temporal confirmation function 172 can assist with detecting and identifying backup failures 173 for any backup copies 160 that have been affected in these scenarios.

In certain embodiments, the backup storage platform 150 periodically (e.g., hourly, daily, weekly, etc.) executes the verifications functions 175 (including the restoration confirmation function 171 and temporal confirmation function 172) on each of the backup copies 160 to continuously ensure the integrities of the backup copies 160. For example, in some cases, the verification functions 175 can be executed automatically each day on each of the backup files 160 to check for issues related to data corruption, recoverability, and contemporaneousness of information. This continuous monitoring of the backup files 160 can significantly decrease the chances of data loss and allows for the rapid detection of any backup failures 173. Moreover, in scenarios where a data loss event occurs (e.g., files 135 stored on the client servers 130 are lost or damaged), the continuous monitoring of the backup files 160 significantly mitigates any risks associated with restoring the lost data.

The backup storage platform 150 may execute one or more remedial actions 180 in response to detecting that a backup copy 160 that has been negatively affected (e.g., in response to detecting a backup copy 160 has been corrupted and/or does not include current information). The types of remedial actions 180 executed by the backup storage platform 150 may vary.

One exemplary remedial action 180 may involve transmitting one or more notifications to client users and/or administrator users. For example, in response to the restoration confirmation function 171 detecting a corrupted backup copy 160 and/or the temporal confirmation function 172 detecting a backup copy 160 is not current, the backup storage platform 150 may transmit one or more notifications to various users. In some cases, notifications may be transmitted to client users (e.g., IT staff, administrators, and/or other individuals associated with operation of the client servers 130) and/or administrator users associated with the providing the backup storage platform 150. The notifications can be transmitted in various ways (e.g., via e-mails, text messages, inbox messages accessible via user accounts, etc.)

The notifications can include any or all information related to a detected backup failure 173. For example, the notifications may indicate the type of error that was detected (e.g., corrupted data, non-current information, etc.), the time and date the failure was detected, the particular file 135 and/or database file 131 that affected by the failure, and/or any other related information. The notifications also may include selectable options that enable the users to manually initiate creation of a new backup for the file that was affected by the backup failure 173.

Notifications also can be sent to users (e.g., both client users associated with the client servers 130 and/or administrator users associated with providing the backup storage platform 150) in other scenarios which do not relate to failures. For example, in some cases, notifications may be sent automatically on a periodic basis (e.g., daily, weekly, or monthly) that include status reports pertaining to accounts on the backup storage platform 150. The notifications may indicate when a most recent verified backup copy 160 was stored for each file that is backed up using the backup storage platform 150, information related to any backup failures 173 that occurred, and/or any other information related to a client account.

Figure 3:
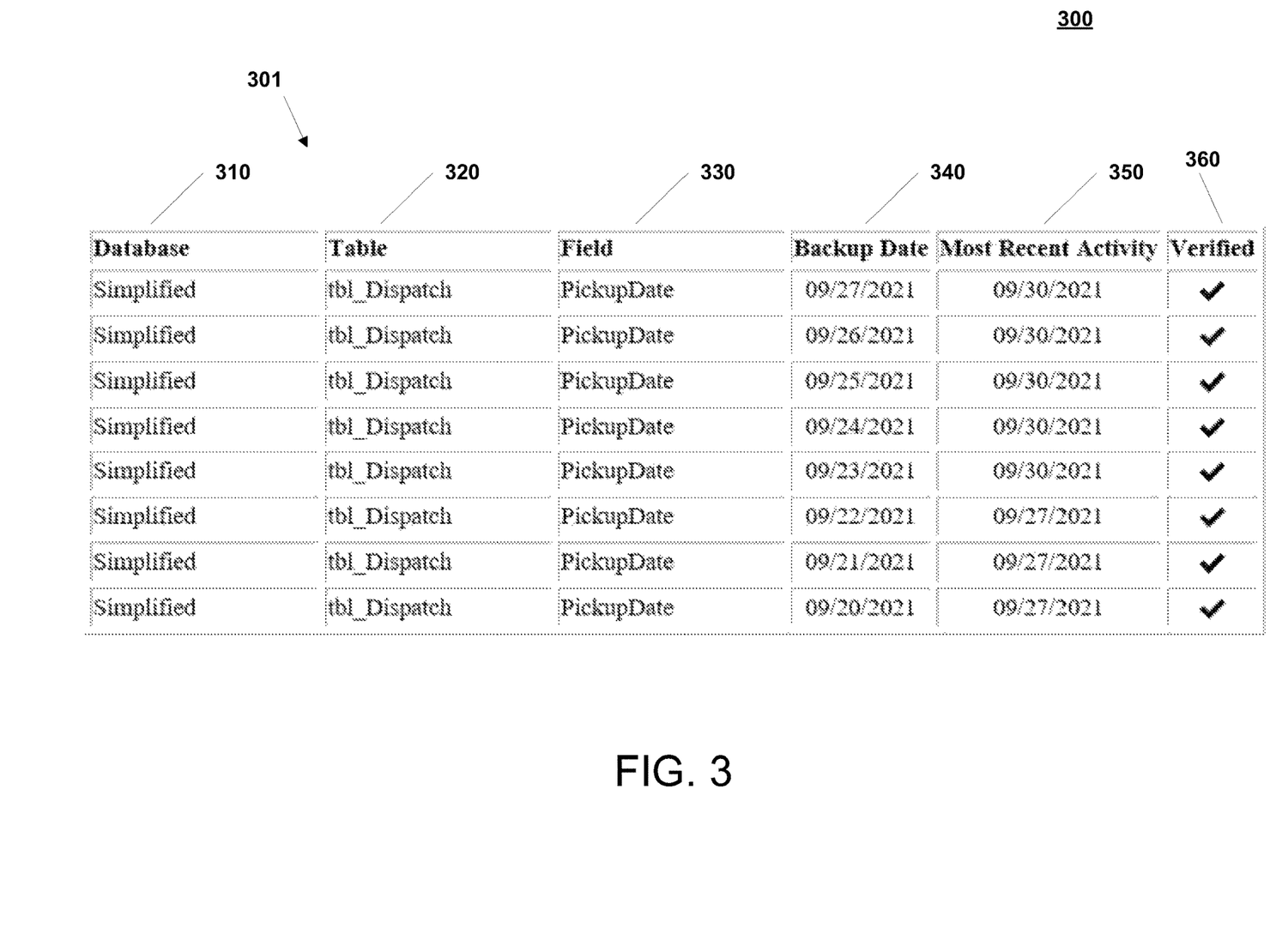
FIG. 3 is an exemplary notification that may be generated by a backup storage platform in accordance with certain embodiments.

FIG. 3 discloses an exemplary notification 300 that may be transmitted to users according to certain embodiments. This exemplary notification 300 can be transmitted to client users and/or administrators on a periodic basis to provide a summary of recent backup activities executed by the backup storage platform 150.

The notification 300 comprises a table 301 summarizing the recent backup activities. Each row in the table 310 corresponds to a particular backup operation was that performed. A first column 310 identifies a database file that was backed up. A second column 320 identifies a table within the database file on which one or more verification functions 175 were performed to confirm the integrity and/or contemporaneousness of the database file. A third column 330 identifies a field within the table that was utilized to confirm the contemporaneousness of the database file. A fourth column 340 indicates a date the database file was backed up by the backup storage platform 150. A fifth column 350 indicates a date the database file was most recently updated (e.g., the version of the database file stored on a client server 130). A sixth column 360 indicates the result of verification functions 175 performed on the database file. For example, a checkmark can indicate that the integrity of a backup copy for the database file was confirmed and/or that the backup copy includes contemporaneous information. Conversely, an "X" or other indicator can be included in the sixth column 360 to indicate that a backup copy has been corrupted and/or does not include contemporaneous information.

Returning to FIGS. 1A and 1B, another exemplary remedial action 180 that may be executed by the backup storage platform 150 may involve automatically communicating with a local client application 132 to obtain a replacement backup copy 160. For example, in response to the restoration confirmation function 171 detecting a corrupted backup copy 160 and/or temporal confirmation function 172 detecting a backup copy 160 is not current, the backup storage platform 150 may transmit a request to a local client application 132 to retrieve a new backup copy 160 for the file 135 affected by the backup failure 173. In response to receiving the request, the local client application 132 may compress and encrypt a new copy of the file 135 that was affected and transmit the file 135 over the network 190 to the backup storage platform 150.

In certain embodiments, the verification functions 175 performed by the verification component 170 (including the restoration confirmation function 171, temporal confirmation function 172, and remedial functions 180) can be executed periodically (e.g., once a day, twice a day, weekly, monthly, and/or at some other time increment). In certain embodiments, the functions performed by the verification component 170 can additionally, or alternatively, be executed by the verification component 170 upon receiving files 135 at the backup storage platform 150. In certain embodiments, the functions performed by the verification component 170 can additionally, or alternatively, be executed in response to commands manually received from users (e.g., in response to users selecting an option on an interface).

Figure 2:
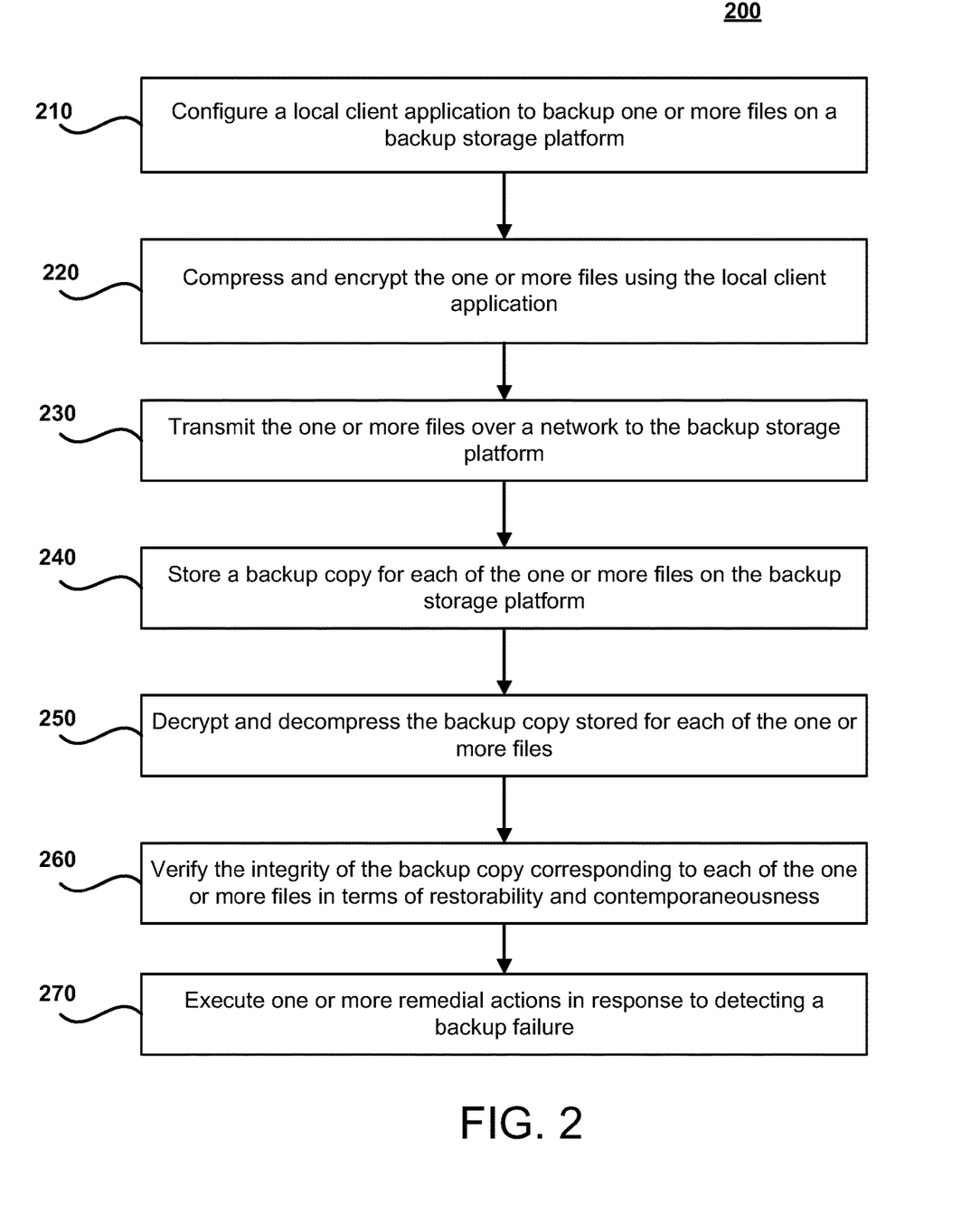
FIG. 2 is a flow chart illustrating of an exemplary method in accordance with certain embodiments.

FIG. 2 is a flow chart for an exemplary method 200, according to certain embodiments. Method 200 is merely exemplary and is not limited to the embodiments presented herein. Method 200 can be employed in many different embodiments or examples not specifically depicted or described herein. In some embodiments, the steps of method 200 can be performed in the order presented. In other embodiments, the steps of method 200 can be performed in any suitable order. In still other embodiments, one or more of the steps of method 200 can be combined or skipped. In many embodiments, system 100, backup servers 120, client servers 130, verification component 170, and/or the backup storage platform 150 can be suitable to perform method 200 and/or one or more of the steps of method 200. In these or other embodiments, one or more of the steps of method 200 can be implemented as one or more computer instructions configured to run at one or more processing devices 102 and configured to be stored at one or more non-transitory memory storage devices (e.g., storage devices 101). Such non-transitory memory storage devices can be part of a computer system such as system 100, backup servers 120, client severs 130, verification component 170, and/or the backup storage platform 150. The processing devices 102 can be similar or identical to the processing devices described above with respect to system 100.

In step 210, a local client application 132 is configured to backup one or more files 135 on a backup storage platform 150. This may involve installing the local client application 132 on a client server 130 and/or utilizing one or more interfaces (e.g., GUIs or graphical user interfaces) associated with the local client application 132 to identify and select files 135 to be backed up. In certain embodiments, the one or more files 135 may include one or more database files 131.

In step 220, the one or more files 135 are compressed and encrypted using the local client application 132. Any appropriate compression and encryption technique may be utilized.

In step 230, the one or more files 135 are transmitted over a network 190 to the backup storage platform 150. In some cases, the network 190 may include the Internet, and the one or more files 135 may be transmitted over a secure communication link.

In step 240, a backup copy 160 for each of the one or more files 135 is stored on the backup storage platform 150.

In step 250, the backup copy 160 stored for each of the one or more files 235 is decrypted and decompressed by the backup storage platform 150.

In step 260, the integrity of the backup copy 160 corresponding to each of one or more files is verified in terms of restorability and contemporaneousness. For example, as explained above, this may involve executing a restoration confirmation function 171 that attempts to restore the backup copy 160, determine if the back copy 160 is a useable, and/or determine if the backup copy is corrupt. This also may include executing a temporal confirmation function 172 that determines whether the contents of the backup copy 160 is contemporaneous or current. In scenarios in which a backup copy 160 corresponds to a database file 131, the temporal confirmation function 172 may utilize a database-agnostic script to analyze the contents of the database and identify a data point (e.g., a field, column, row, etc.) that includes temporal information in order to evaluate the contemporaneousness of the database file 131.

For example, in a scenario in which a backup copy pertains to a payroll database, the temporal confirmation function 172 may identify a data point in the database that indicates a previous or most recent date on which paychecks were provided and the date(s) associated with the data point may be analyzed to determine if the database is contemporaneous. Likewise, in a scenario involving a backup copy pertaining to a transactions database (e.g., which stores information associated with purchasing products or services), the temporal confirmation function 172 may identify a data point in the database that indicates the most recent date on which a purchase was made and this information may be used to determine if the database is contemporaneous.

In step 270, one or more remedial actions 180 are executed in response to detecting a backup failure 173. A backup failure 173 may indicate that a backup file 160 was not able to be verified in terms of restorability and contemporaneousness. In the event a backup copy 160 is determined to be corrupt, non-restorable, and/or non-contemporaneous (e.g., not including current information), the backup storage platform 150 may execute one or more remedial actions 180. Exemplary remedial actions 180 may include transmitting one or more notifications to users (e.g., client and/or administrator users) and/or communicating with the local client application 132 to obtain a replacement backup copy.

In certain embodiments, a system is provided for verifying the integrity of backup copies on a backup storage platform. The system comprises one or more computing devices comprising one or more processors and one or more non-transitory storage devices for storing instructions, wherein execution of the instructions by the one or more processors causes the one or more computing devices to: receive a file at a backup storage platform; generate a backup copy of the file received at the backup storage platform; execute, using the backup storage platform, verification functions on the backup copy of the file, wherein executing the verification functions at least includes: (a) executing, a restoration confirmation function, that attempts to restore the backup copy and determine whether the backup copy has been corrupted; and (b) executing, a temporal confirmation function, that determines whether the backup copy is current or contemporaneous; and detect whether a backup failure occurred with respect to generating the backup copy based, at least in part, on the restoration confirmation function and the temporal confirmation function.

In certain embodiments, a method is implemented via execution of computing instructions configured to run on one or more processors and configured to be stored on one or more non-transitory storage devices. The method comprises: receiving a file at a backup storage platform; generating a backup copy of the file received at the backup storage platform; executing, using the backup storage platform, verification functions on the backup copy of the file, wherein executing the verification functions at least includes: (a) executing, a restoration confirmation function, that attempts to restore the backup copy and determine whether the backup copy has been corrupted; and (b) executing, a temporal confirmation function, that determines whether the backup copy is current or contemporaneous; and detecting whether a backup failure occurred with respect to generating the backup copy based, at least in part, on the restoration confirmation function and the temporal confirmation function.

In certain embodiments, a computer program product is provided. The computer program product comprises a non-transitory computer-readable storage device including instructions for causing a computing device to: receive a file at a backup storage platform; generate a backup copy of the file received at the backup storage platform; execute, using the backup storage platform, verification functions on the backup copy of the file, wherein executing the verification functions at least includes: (a) executing, a restoration confirmation function, that attempts to restore the backup copy and determine whether the backup copy has been corrupted; and (b) executing, a temporal confirmation function, that determines whether the backup copy is current or contemporaneous; and detect whether a backup failure occurred with respect to generating the backup copy based, at least in part, on the restoration confirmation function and the temporal confirmation function.

While various novel features of the invention have been shown, described, and pointed out as applied to particular embodiments thereof, it should be understood that various omissions and substitutions, and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

What is claimed is:

1. A system for verifying backup copies on a backup storage platform, comprising:
   one or more computing devices comprising one or more processors and one or more non-transitory storage devices for storing instructions, wherein execution of the instructions by the one or more processors causes the one or more computing devices to:
   receive a database file at a backup storage platform;
   generate a backup copy of the database file received at the backup storage platform;
   execute, using the backup storage platform, verification functions on the backup copy of the database file, wherein executing the verification functions at least includes:
      executing a restoration confirmation function that determines whether the backup copy is restorable by attempting to create a restored version of the backup copy on the backup storage platform; and
      in response to determining that the backup copy is restorable, executing a temporal confirmation function on the restored version of the backup copy to determine whether the backup copy is current or contemporaneous, the temporal confirmation function being configured to analyze one or more data points within the restored version of the backup copy to determine whether the database file includes current or contemporaneous information; and
   detect whether a backup failure occurred with respect to the backup copy based, at least in part, on the restoration confirmation function and the temporal confirmation function.

2. The system of claim 1, wherein:
detecting whether a backup failure occurred includes: a) detecting whether the backup copy is corrupted; b) detecting whether the backup copy is unable to be restored; and c) detecting whether the backup copy does not include current or contemporaneous information; and
one or more remedial functions are executed in response to detecting an occurrence of the backup failure.

3. The system of claim 2, wherein executing the one or more remedial functions includes:
   automatically retrieving an updated copy of the database file; and
   generating a new backup copy of the database file on the backup storage platform.

4. The system of claim 3, where executing the one or more remedial functions further includes transmitting one or more notifications to one or more users, the one or more notifications including information that describes the occurrence of the backup failure.

5. The system of claim 1, wherein:
the database file received at the backup storage platform is encrypted and compressed; and
the restoration confirmation function, executed by the backup storage platform, attempts to decrypt and decompress the backup copy prior to attempting to restore the database file.

6. The system of claim 1, wherein:
the backup storage platform is stored on and executed by one or more backup servers;
the database file is received from one or more client servers over a network; and
the one or more backup servers are in communication with the one or more client servers over the network.

7. The system of claim 1, wherein the backup storage platform is stored on and executed locally by one or more client servers.

8. The system of claim 1, wherein a backup retrieval function enables the backup copy to be accessed and retrieved from the backup storage platform.

9. The system of claim 8, wherein:
the backup retrieval function is configured to transmit a request for retrieving the backup copy to the backup storage platform over a network; and
in response to receiving the request, the backup storage platform encrypts the backup copy and transmits the backup copy over a network to a client server or computing device.

10. The system of claim 1, wherein:
the verification functions are executed periodically by the backup storage platform; and
one or more notifications are periodically transmitted to one or more users indicating results of the verification functions.

11. A method implemented via execution of computing instructions configured to run on one or more processors and configured to be stored on one or more non-transitory storage devices, the method comprising:
   receiving a database file at a backup storage platform;
   generating a backup copy of the database file received at the backup storage platform;
   executing, using the backup storage platform, verification functions on the backup copy of the database file, wherein executing the verification functions at least includes:
      executing a restoration confirmation function that determines whether the backup copy is restorable by attempting to create a restored version of the backup copy on the backup storage platform; and
      in response to determining that the backup copy is restorable, executing a temporal confirmation function on the restored version of the backup copy to determine whether the backup copy is current or contemporaneous, the temporal confirmation function being configured to analyze one or more data points within the restored version of the backup copy to determine whether the database file includes current or contemporaneous information; and
   detecting whether a backup failure occurred with respect to the backup copy based, at least in part, on the restoration confirmation function and the temporal confirmation function.

12. The method of claim 11, wherein:
detecting whether a backup failure occurred includes: a) detecting whether the backup copy is corrupted; b) detecting whether the backup copy is unable to be restored; and c) detecting whether the backup copy does not include current or contemporaneous information; and one or more remedial functions are executed in response to detecting an occurrence of the backup failure.

13. The method of claim 12, wherein executing the one or more remedial functions includes:
automatically retrieving an updated copy of the database file; and
generating a new backup copy of the database file on the backup storage platform.

14. The method of claim 13, where executing the one or more remedial functions further includes transmitting one or more notifications to one or more users, the one or more notifications including information that describes the occurrence of the backup failure.

15. The method of claim 11, wherein:
the database file received at the backup storage platform is encrypted and compressed; and
the restoration confirmation function, executed by the backup storage platform, attempts to decrypt and decompress the backup copy prior to attempting to restore the database file.

16. The method of claim 11, wherein:
the backup storage platform is stored on and executed by one or more backup servers;
the database file is received from one or more client servers over a network; and
the one or more backup servers are in communication with the one or more client servers over the network.

17. The method of claim 11, wherein the backup storage platform is stored on and executed locally by one or more client servers.

18. The method of claim 11, wherein a backup retrieval function enables the backup copy to be accessed and retrieved from the backup storage platform.

19. The method of claim 18, wherein:
the backup retrieval function is configured to transmit a request for retrieving the backup copy to the backup storage platform; and
in response to receiving the request, the backup storage platform encrypts the backup copy and transmits the backup copy over a network to a client server or computing device.

20. A computer program product comprising a non-transitory computer-readable storage device including instructions for causing a computing device to:
receive a database file at a backup storage platform;
generate a backup copy of the database file received at the backup storage platform;
execute, using the backup storage platform, verification functions on the backup copy of the database file, wherein executing the verification functions at least includes:
executing a restoration confirmation function that determines whether the backup copy is restorable by attempting to create a restored version of the backup copy on the backup storage platform; and
in response to determining that the backup copy is restorable, executing a temporal confirmation function on the restored version of the backup copy to determine whether the backup copy is current or contemporaneous, the temporal confirmation function being configured to analyze one or more data points within the restored version of the backup copy to determine whether the database file includes current or contemporaneous information; and
detect whether a backup failure occurred with respect to generating the backup copy based, at least in part, on the restoration confirmation function and the temporal confirmation function.

\* \* \* \* \*